UNITED STATES PATENT OFFICE.

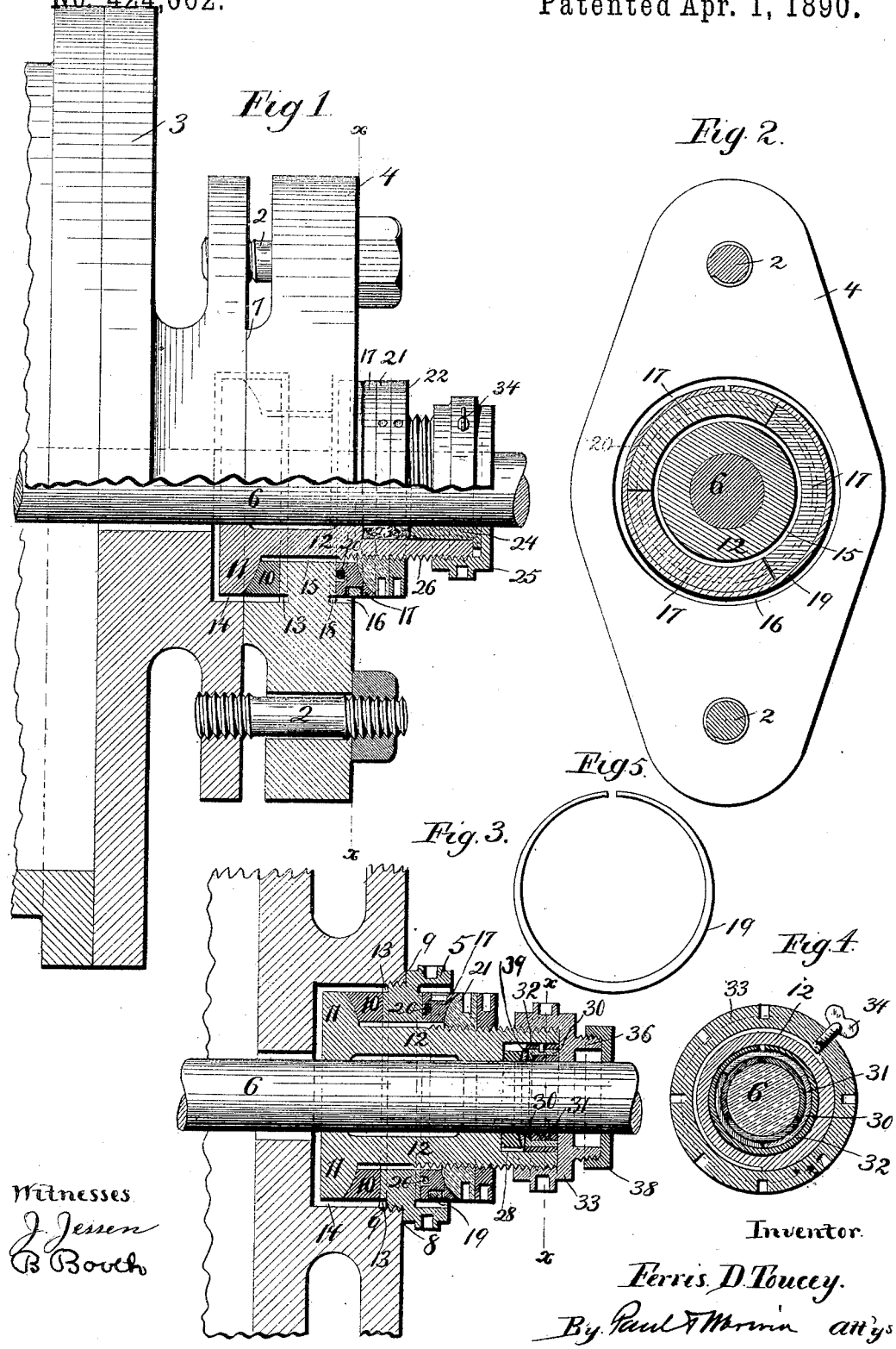

FERRIS D. TOUCEY, OF MINNEAPOLIS, MINNESOTA, ASSIGNOR OF TWO-THIRDS, BY DIRECT AND MESNE ASSIGNMENTS, TO GEORGE S. GRIMES AND CHARLES CUTLER, BOTH OF SAME PLACE.

PISTON-ROD PACKING.

SPECIFICATION forming part of Letters Patent No. 424,662, dated April 1, 1890.

Application filed June 27, 1889. Serial No. 315,823. (No model.)

*To all whom it may concern:*

Be it known that I, FERRIS D. TOUCEY, of Minneapolis, in the county of Hennepin and State of Minnesota, have invented certain new and useful Improvements in Automatic Combined Metallic and Flexible Piston-Rod Packing, of which the following is a specification.

My invention relates to the packing of valve and piston rods for steam-engines and air and water pumps; and its object is to provide improved means in the arrangement of the packing of said rods, whereby the same automatically adjusts itself to the various movements of the rod in its forward and backward stroke, and its oscillating and lateral motion, due to the springing of the guides, or to the guides being out of line, or the piston out of center of cylinder, or lateral motion in the cross-head, or any other cause, producing irregularity of motion of the rod, the improved results avoiding all unnecessary friction and wear upon the rod and of the packing itself, there being no friction of the rod in passing through the gland or cylinder-head, and the only friction being that which is unavoidable in the passing of the rod through the packing, while a steam-tight joint is secured and the rod properly wiped and lubricated.

My invention is, further, an improvement of a prior invention of one E. F. Scallen and myself upon packing for piston-rods, which was patented September 18, 1877, No. 195,421.

My invention consists, further, in the construction and combination hereinafter described, and particularly pointed out in the claims.

In the accompanying drawings, forming a part of this specification, Figure 1 is a side elevation and partial vertical longitudinal section of a cylinder-head provided with a gland bolted thereto and fitted with my improved packing. Fig. 2 is a cross-section of the same on line *x x* of Fig. 1. Fig. 3 is a vertical longitudinal section of a modified form of gland and packing. Fig. 4 is a detail cross-section of the same on line *x x* of Fig. 3, and Fig. 5 is a detail of the eccentric spring embracing the tension-ring.

As shown in Fig. 1, my improvement is provided with flexible packing, while in Fig. 3 it is shown fitted with metallic packing, to which I prefer to add a secondary or additional flexible packing arranged in a recess outside of the cap-nut securing the metallic packing, which serves to lubricate the rod and exclude dust.

In the drawings, 3 represents the cylinder-head, and 4 the gland which is bolted thereto, as shown in Fig. 1, or, as shown in Fig. 3, the modified form of gland 5 is screwed into the cylinder-head instead of being bolted to it, making in both cases a steam-tight joint with the cylinder-head.

In adapting my improved packing to the ordinary form of cylinder-heads the construction shown in Fig. 1 is preferred; but in manufacturing the whole together the construction in Fig. 3 is preferred as a simpler and less expensive construction.

6 is the piston-rod, which is so arranged as to be in contact simply with the packing, and packing is so arranged as to be automatically adjustable to the varying movements of the parts and to maintain a uniform pressure and consequent friction upon the outer surface of the rod, so that there is no undue wearing of the rod. The gland is fitted to the cylinder-head, so as to form a steam-tight fixed joint at 7 or 8, according to the construction used, the bolts 2 in one form and the screw-thread 9 in the other form rigidly securing the gland in place.

Arranged upon the inside of the gland and forming a ground steam-tight joint therewith is the female or socket ring 10, which, with the male ball-ring 11 of the guiding-sleeve 12, forms a live ball-joint. In the construction shown in Fig. 1 the gland is socketed to receive the ring 10, while in the construction shown in Fig. 3 the socket receiving the ring 10 and the ball 11 of the sleeve 12 is wholly in the cylinder-head, the ring 10 bearing upon the inner face of the gland. In both constructions I prefer to arrange the annular socket 13 next to the outer wall of the socket in which the ring 10 is held, so as to prevent the forming of a shoulder in the corner of the recess as the ring 10 wears down the surface of the gland in its lateral motion. The socket 14 is made of slightly greater diameter than the ring 10 and ball-ring 11 of the sleeve 12, whereby these parts are allowed a lateral motion in the socket, while at the same time the joint between the ring 10 and the gland is kept steam-tight. The ball-joint between the ring 10 and the sleeve 12 allows for oscillating play of the parts, while at the same time the joint is kept perfectly steam-tight. The diameter of the sleeve 12 is slightly less than that of the opening 15 of the gland, which allows lateral and oscillating play of the parts, the outwardly-projecting part of the sleeve 12 being exteriorly screw-threaded. The outer face of the gland is provided with a circular socket 16 to receive the sectional tension-ring 17, which is of slightly less diameter than the socket, so as to be capable of lateral motion in the same manner as the ring 10, the socket 16, being also provided with an annular recess 18, in arrangement and function corresponding to the recess 13, above described. The sectional tension-ring 17 is divided into any desired number of sections and is provided with an exterior rectangular groove in its periphery, in which is received the eccentric-spring 19, by the tension of which the sections of the ring are held closely together. The inner face of the ring is also preferably provided with an annular groove to receive the spring 20, which assists in holding the sections together. The outer face of the ring is spherically hollowed out, so as to constitute it the female part of the ball-joint. The male or ball part of the joint is formed by the screw-threaded ring 21, which engages the threaded portion of the sleeve 12 and when screwed down upon the sectional ring 17 forms with it a close live ball-joint. I prefer to provide also another screw-threaded ring 22, to follow the ring 21 and be screwed down upon it, so as to lock it firmly in place.

The parts above described when fitted together have an inner plane steam-tight joint and inner and outer ball-joints, whereby all lateral and oscillating motion of the rod is compensated for or taken up, while the sectional tension-ring serves to give elasticity to the combined parts.

The interior of the end of the sleeve 12, projecting outward from the gland, is cored out to form a packing-recess. As shown in Fig. 1, this recess is supplied with flexible packing, which may be of any suitable material and fitted in place in the usual manner. This packing 23 is compressed and held firmly in place with any desired pressure by means of an annular ring 24, which is preferably divided longitudinally into two sections and arranged to fit into the recess of the sleeve 12 and to bear upon said packing, this ring being secured by means of the exteriorly-threaded cap-nut 25, which engages with the exterior thread 26 of the sleeve and bears upon the ring 24.

As shown in Fig. 3, a metallic packing is used, in general features corresponding to my prior patented invention above referred to, but with some improved features.

The spring-ring 28, preferably of similar form to the clasp-ring 19, with its upper face slightly concave, is placed in the bottom of the recess of the guiding-sleeve. The metallic packing 39, having its lower face convex to fit into the spring, is then placed in the recess of the thimble and bears against the spring, which yields and expands to pressure of the packing.

The packing 39 consists of the L-shaped sectional ring 30, which rests upon the cushion-spring and the interior sectional ring 31, contained within said ring 30. These rings are arranged together so as to break joints, and may be so held in any desired manner, as by a dowel in one entering a hole in the other. Embracing the ring 30 is the preferably eccentric clasp-spring 32 of the same general form as the spring 19.

The advantage of a spring of the form above described is that by being made thicker in its middle and tapering toward either end it will exert a uniform pressure upon the entire periphery of the inclosed ring, whereas with a spring of uniform thickness the clasp of the spring will be much weaker near its end than at any other point.

The cap-nut 33, of the same general form as 25, is screwed down upon the end of the sleeve, making a steam-tight joint therewith. In order to firmly secure said cap-nut in position, I prefer to provide it with a set-screw 34, between the end of which and the screw-threads of the thimble is preferably interposed a piece of wood or soft metal which will crush upon the threads under pressure without injuring them, by means of which the cap-nut may be firmly locked in place. Where metallic packing is used I prefer to provide an annular projection 36 on the outer end of the cap-nut, which is also exteriorly screw-threaded and has an annular space between its interior surface and the piston-rod. This space is adapted to receive any suitable flexible packing, by means of which the rod is lubricated and the dust excluded, a suitable secondary cap-nut 38, interiorly screw-threaded, being screwed down upon said annular projection 36 and holding the packing firmly in place.

I claim—

1. The combination, with a cylinder-head and a gland rigidly secured thereto and forming a solid tight joint therewith, of a sleeve of slightly less diameter than the opening in the gland through which it passes, having its outer end exteriorly screw-threaded and its inner end provided with a spherically-rounded shoulder or collar adapted to form the male part of a ball-joint, a suitable ring interposed between said gland and the shoulder of said sleeve and forming a steam-tight joint with said gland and constituting the female part of a ball-joint with said sleeve, said ring having free lateral play upon the surface of said gland and spring-clasped sectional ring bearing upon the outer surface of said gland and having free lateral play upon the same, a suitable screw-threaded ring adapted to engage with the exterior thread of said sleeve and to fit upon said spring-clasped sectional ring, forming a ball-joint with the same, and suitable metallic or flexible packing arranged in said packing-sleeve and held in place by a cap-nut engaging with said thimble, substantially as and for the purposes set forth.

2. The combination, with a cylinder-head and a gland rigidly secured thereto, of a sleeve of less diameter than the opening in said gland, provided with attachments by means of which a steam-tight plane joint is made with the inner face of said gland and a plane joint with the outer face of said gland, both of said joints allowing lateral motion of said sleeve and also forming interior and exterior ball-joints, by means of which oscillating movement of said sleeve is permitted, and suitable packing arranged in a recess in said sleeve and adapted to bear upon a rod reciprocated through the same, substantially as and for the purposes set forth.

3. The combination, with a cylinder-head, an exterior gland rigidly secured thereto, and a guiding-sleeve extending through said gland and forming both inside and outside of said gland both plane and ball joints therewith, whereby both lateral and oscillating motion between the gland and sleeve is permitted, of metallic packing arranged in said sleeve upon an elastic support and secured therein by means of a cap-nut engaging with said sleeve, and flexible packing arranged in a recess in said nut, adapted to bear upon and lubricate a rod passing through the same, substantially as and for the purposes set forth.

4. The combination, with the cylinder-head 3 and the gland 4, rigidly secured thereto, having an inner ground surface, of the female ring 10, bearing upon said ground surface, the sectional tension-ring 17, bearing upon its outer face and provided with suitable spring-clasps, the guiding-sleeve 12, provided with the male ring 11, forming a ball-joint with said ring 10, the male ring 21, engaging with said sleeve and forming a ball-joint with said ring 17, the cushion-spring 28, arranged in said sleeve, the spring-controlled packing-rings 30 and 31, resting upon spring 28, the cap-nut 33, engaging with said sleeve and securing said packing-rings in place and having the annular projection 36 on its outer end, and the flexible packing 37, arranged within said annular projection and bearing against the surface of a rod passing through the same, substantially as and for the purposes set forth.

5. The combination, with a cylinder-head and a gland rigidly secured thereto, of a guiding-sleeve arranged loosely within said gland, both plane and ball joints between the sleeve and gland on each side of said gland, and suitable packing arranged in said sleeve, substantially as described.

6. In a device of the class described, the combination of a cylinder-head, a gland screwed into the same and forming a rigid tight joint therewith, a guiding-sleeve surrounding the piston-rod and passing loosely through said gland, both plane and ball joints on each side thereof between it and said sleeve, and suitable packing arranged in said sleeve around said piston-rod, substantially as and for the purposes set forth.

In testimony whereof I have hereunto set my hand, this 14th day of June, 1889.

FERRIS D. TOUCEY.

In presence of—
T. D. MERWIN,
A. M. GASKILL.